UNITED STATES PATENT OFFICE.

WILLIAM WALLACE, OF COLORADO SPRINGS, COLORADO.

INSECTICIDE.

SPECIFICATION forming part of Letters Patent No. 587,469, dated August 3, 1897.

Application filed April 2, 1896. Serial No. 585,981. (No specimens.)

*To all whom it may concern:*

Be it known that I, WILLIAM WALLACE, a citizen of the United States, residing at Colorado Springs, in the county of El Paso, State of Colorado, have invented certain new and useful Improvements in Fungi-Exterminating Compounds; and I do hereby declare the following to be a full, clear, and exact description of the invention, such as will enable others skilled in the art to which it appertains to make and use the same.

My invention relates to means for preventing mildew and other parasitic fungi in greenhouses, garden structures, and other localities where they are liable to appear, and has for its object to provide a chemical compound which when heated will give off fumes or vapors of such nature as to destroy the objectionable growths and so affect the structure as to prevent the objectionable vegetation.

With this object in view my invention consists of sulfur, a cerate of beeswax, stearic wax, and gum asafetida in the following proportions: sulfur, eight parts; cerate of beeswax, one part; stearic wax, one part, with the addition of gum asafetida in the proportion of forty grains to one pound of the compound.

This compound is thoroughly mixed and treated by melting in a retort and afterward grinding to a powder to cause its elements to mutually combine, after which it may be heated in suitable quantities and to such an extent as to cause it to give off fumes, which, rising, will act upon the fungus growth and will utterly destroy it, and, moreover, will so affect the structure as to prevent growth of the objectionable matter.

It will be readily understood that I may vary the particular proportions of the ingredients hereinbefore mentioned.

Having now described my invention, what I claim is—

The herein-described compound, comprising sulfur, cerate of beeswax, stearic wax, and gum asafetida.

In testimony whereof I affix my signature in presence of two witnesses.

WILLIAM WALLACE.

Witnesses:
F. B. HART,
A. A. DOYLE.